UNITED STATES PATENT OFFICE.

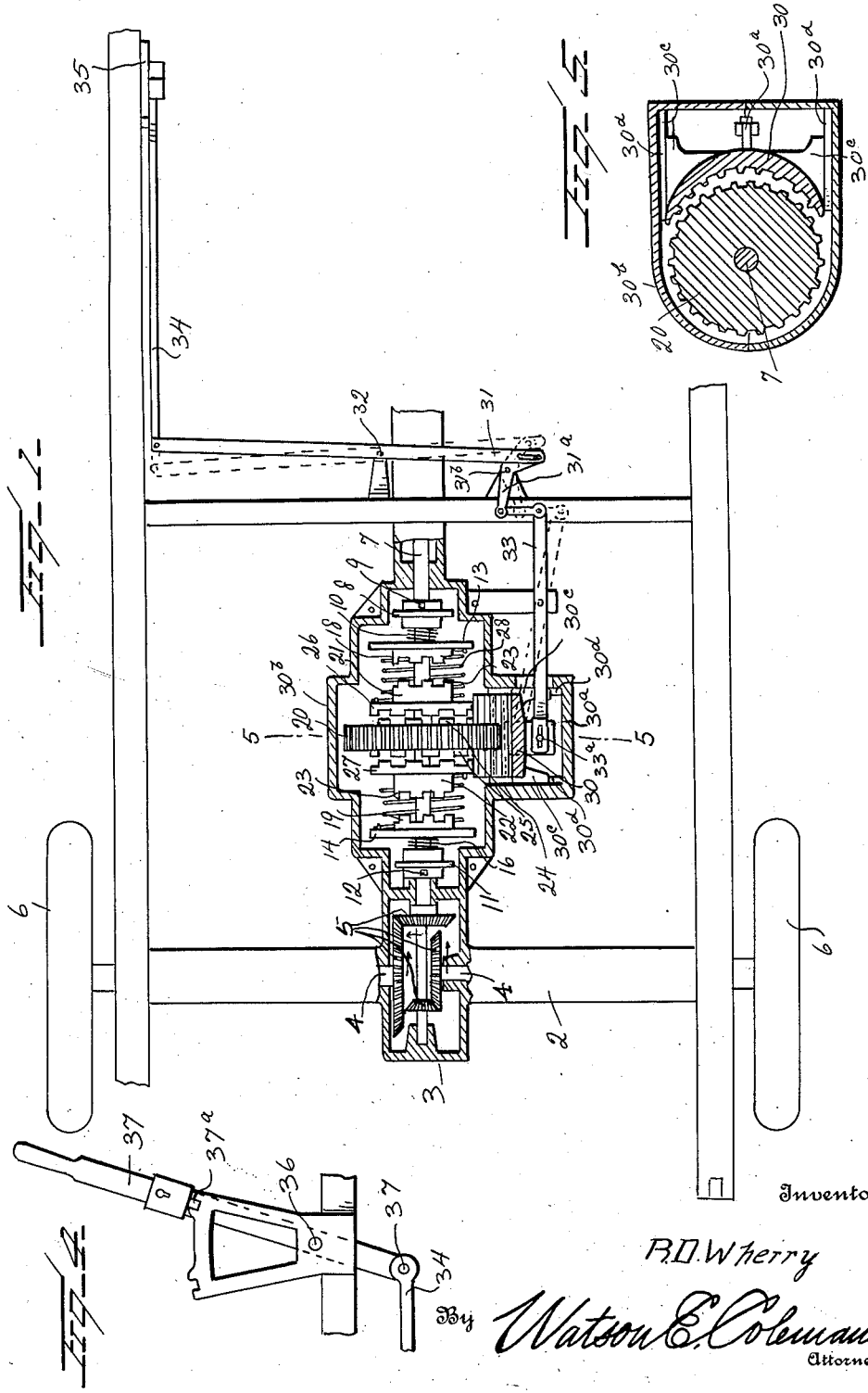

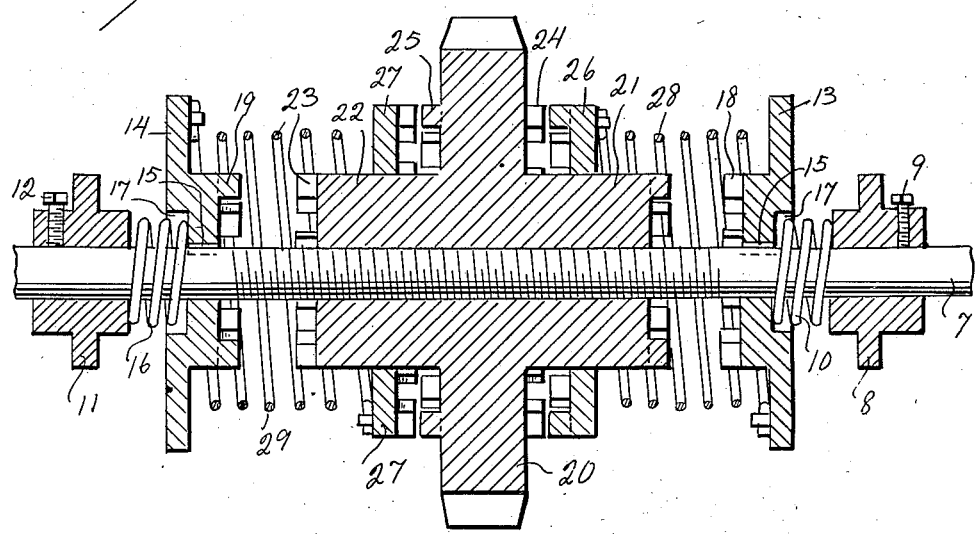
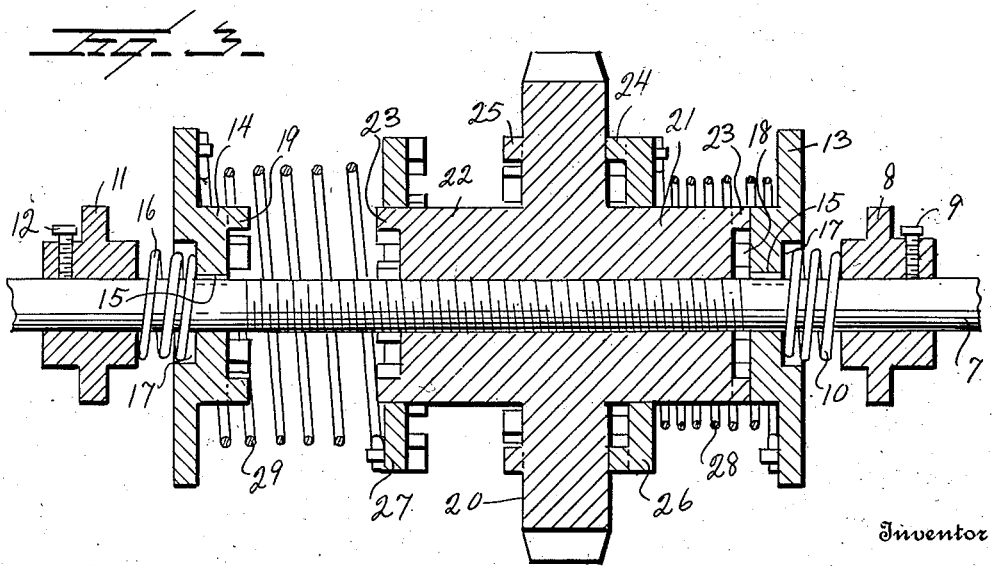

ROBERT D. WHERRY, OF NECHES, TEXAS.

MOTOR-ACTUATED LOCKING DEVICE FOR AUTOMOBILES.

1,322,171.  Specification of Letters Patent.  Patented Nov. 18, 1919.

Application filed May 3, 1919. Serial No. 294,578.

*To all whom it may concern:*

Be it known that I, ROBERT D. WHERRY, a citizen of the United States, residing at Neches, in the county of Anderson and State of Texas, have invented certain new and useful Improvements in Motor-Actuated Locking Devices for Automobiles, of which the following is a specification, reference being had to the accompanying drawings.

This invention relates to a motor actuated locking device for automobiles, and an object of the invention is to provide a locking device of this kind including means to be set and locked and means to be actuated by the motor driven shaft of the automobile, whereby when an unauthorized person endeavors to move the car by pushing the same, or operating the shaft by the motor, the motor driven shaft will actuate parts of the locking mechanism, thereby preventing the driving shaft from continuing its operations, hence preventing the unauthorized person from appropriating the automobile for personal use.

A further object of the invention is the provision of a locking mechanism, which may operate when the driving shaft is operating the driving wheels forwardly, or when operating them to drive the vehicle rearwardly.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts as will be hereinafter set forth, shown in the drawings and claimed.

In the drawings:

Figure 1 is a plan view of a portion of an automobile chassis, and the rear axle casing, showing the same broken away, illustrating the differential, and also illustrating the motor driven shaft, and the locking mechanism applied thereto in plan.

Fig. 2 is a sectional view through the same showing the locking parts thereof in their normal positions.

Fig. 3 is a sectional view showing certain of the parts as having been moved, to lock the driving shaft of the automobile.

Fig. 4 is an enlarged detail view of the locking mechanism.

Fig. 5 is a sectional view on line 5—5 of Fig. 1, showing the curvature of the part 30, whereby its teeth may mesh with the teeth of the gear 20.

Referring to the drawings, 1 designates a portion of the chassis or frame, 2 the rear axle casing, and 3 the differential casing, which is broken away, showing the rear axle 4 and the differential gears 5. Supporting wheels 6 are mounted upon the rear axle, and 7 denotes the motor driven shaft, the rear end of which is mounted in bearings of the differential casing and in coöperation with the differential.

An abutment disk 8 is secured upon the drive shaft 7 by the set screw or bolt 9, and 10 denotes a coil spring. A second abutment disk 11 is secured upon the drive shaft by means of a set bolt 12, and 13 and 14 denote clutch members which are keyed to rotate with the shaft 7 but movable axially thereon. The keyed connections are designated by the numeral 15. A coil spring 16 is interposed between the clutch member 14 and the abutment disk 11. The remote faces of the clutch members 13 and 14 are recessed, as at 17, to be engaged by the coil springs 10 and 16. The clutch members 13 and 14 have clutch hubs 18 and 19, and mounted and threaded on the drive shaft 7 is a central clutch member 20, provided with opposite clutch hubs 21 and 22 provided with clutch teeth 23. A lever 31, which is pivoted at 32 to the frame, has a slot and pin connection with a bell crank lever 31ª, which is pivoted at 31ᵇ. This bell crank lever 31ª is, in turn, connected to the lever 33, which carries the gear rack 30 at its rear end. The other end of the lever 31 is connected to a link 34, which in turn is connected to the lever 35. This lever 35 is pivoted on the frame or chassis, as at 36, and its short arm is connected pivotally, at 37, to the link 34. This lever 35 is designed to be located near the seat of the automobile, and when moved to its forward or rear position, any suitable means (not shown) may be employed for locking the lever in such position.

When the lever 35 is moved to its extreme backward position, and is locked by any suitable means (not shown), the gear rack will engage the clutch member 20 and hold the clutch member 20 against revolving with the drive shaft 7. Should motion be imparted to the shaft 7, say for instance, in a direction to operate the wheels forwardly, either by operating the motor (not shown) of the vehicle or by pushing the vehicle manually, the clutch member 20 will move forwardly owing to its threaded connection with the shaft, until the clutch member 24 will engage the clutch member 26, thereby winding the spring 28 until the clutch teeth 23 engage the clutch teeth 18 of the clutch member 13, and owing to the abutment disk 8, the shaft 7 will be locked against further rotation. The drive shaft 7 may be locked when it is rotated in the opposite direction or reversed, owing to the fact that the clutch member 20 will feed rearwardly owing to its threaded connections, and the clutch members between 20 and 14 will coact in the same manner as described in regard to the clutch members 24 and 26, and 18 and 23. However, to release the driving shaft, the lever 35 may be reversed, that is operated whereby the gear rack may be moved to release the clutch member 20. Owing to the springs 28 under tension, the clutch hubs 18 and 21 will disengage, as will also the clutch members 24 and 26, until the clutch member 20 reaches its normal position. By a mechanism of this kind, it is possible to lock an automobile, and should it be discovered that the automobile is not properly parked according to the city requirements, the automobile may be shoved manually, until it is parked according to the requirements.

The lever 37 is provided with a locking device, the bolt 37ª of which, when disengaged from between the teeth at the right, as shown in Fig. 4, will automatically engage the teeth at the left of the rack, when the lever 37 is oscillated rearwardly. This bolt 37ª will remain in engagement between the teeth at the left of the rack, and can not be disengaged therefrom until a key has been inserted in the lock and the bolt withdrawn, thereby preventing unauthorized meddling with the lever, for the purpose of operating the automatic lock on the drive shaft. While a conventional form of lock is illustrated in Fig. 4 for the lever 37, it is obvious that any other suitable locking means may be used on the lever, so long as it carries out the operation as above set forth.

The gear rack 30 is also housed by an extension 30ª of the casing 30ᵇ, which forms an integral part of the drive shaft casing and the differential casing 3, thereby preventing the gear rack from being manually disconnected from the central clutch member 20. This gear rack 30 is curved concentrically with relation to the clutch gear member 20, so that the teeth of the gear rack will mesh with a number of the teeth of the clutch gear member 20, in order to prevent accidental disconnecting of the gear rack and the clutch member 20, when in gear. This gear rack 30 is provided with extensions 30ᶜ, which are mounted in guides 30ᵈ, so that the gear rack 30 can move toward and from the periphery of the clutch gear member 20. The lever 33 is connected to the gear rack 30 by means of slot and pin connections 33ª, so that the gear rack can move uniformly with relation to the clutch gear member 20. It is to be remembered that this gear rack may be mounted in the extension of the casing in other ways, without departing from the spirit of the invention. Also the casing 30ᵇ can be made in two parts or otherwise constructed, so as to be applied for the purpose of inclosing various parts of the shaft lock.

The invention having been set forth, what is claimed as new and useful is:

1. In a locking mechanism for automobiles, the combination with a motor driven shaft, abutment disks mounted thereon, clutch members keyed to the shaft but capable of sliding thereon, yieldable means between the clutch members and the abutment disks, a major clutch member threaded on the shaft intermediate said clutch members and adapted to coöperate with either one for locking the shaft, when the shaft is rotated, and means for locking the major clutch member, so that it will feed axially in one direction or the other on the shaft when the shaft is rotated.

2. In a locking mechanism for automobiles, the combination with a motor driven shaft, abutment disks mounted thereon, clutch members keyed to the shaft but capable of sliding thereon, yieldable means between the clutch members and the abutment disks, a major clutch member threaded on the shaft intermediate said clutch members and adapted to coöperate with either one for locking the shaft, when the shaft is rotated, means for locking the major clutch member, so that it will feed axially in one direction or the other on the shaft when the shaft is rotated, and means put under tension when the major clutch member and one of the first clutch members approach each other to return the major clutch member to its normal position when released.

3. In a locking mechanism for automobiles, the combination with a motor driven shaft, abutment disks mounted thereon, clutch members keyed to the shaft but capable of sliding thereon, yieldable means between the clutch members and the abutment disks, a major clutch member threaded on the shaft intermediate said clutch members and adapted to coöperate with either one for locking the shaft, when the shaft is rotated, means for locking the major clutch member, so that it will feed axially in one direction or the other on the shaft when the shaft is rotated, and means put under tension when the major clutch member and one of the first clutch members approach each other to return the major clutch member to its normal position when released, said tensioning means having means coöperating with the major clutch member to hold the tensioning means whereby it can be put under tension, when the major clutch member is held against movement with the shaft.

In testimony whereof I hereunto affix my signature in the presence of two witnesses.

ROBERT D. WHERRY.

Witnesses:
J. D. JAMESON,
D. B. BROWN.